United States Patent [19]

Fitzgerald

[11] 4,195,521
[45] Apr. 1, 1980

[54] VOLUMETRIC FLOW MEASURING DEVICE

[76] Inventor: Joseph C. Fitzgerald, 439 Minorca Ave., Coral Gables, Fla. 33134

[21] Appl. No.: 939,237

[22] Filed: Sep. 5, 1978

[51] Int. Cl.² .............................................. G01F 1/06
[52] U.S. Cl. ..................................................... 73/227
[58] Field of Search ........................ 73/227, 215, 216

[56] References Cited

U.S. PATENT DOCUMENTS

| | | | |
|---|---|---|---|
| 530,337 | 12/1894 | Grover | 73/227 X |
| 1,025,227 | 5/1912 | Wylie | 73/227 |
| 1,164,441 | 12/1915 | Woodman | 73/227 |
| 3,780,578 | 12/1973 | Sellman et al. | 73/227 |

*Primary Examiner*—S. Clement Swisher

[57] ABSTRACT

A volumetric flow measuring device to measure liquid flowing in a pipe wherein a control pipe is sized for receipt in telescoping relation in the pipe and includes seal means to engage the pipe and to constrain flow through the pipe into and out of the control pipe. The control pipe is of a predetermined cross sectional area and a float member is captivated within the pipe to rise and fall depending upon the water level in the control pipe and the float includes a liquid flow velocity measuring device including a paddle wheel journaled on the float with a portion extending below it to move in response to fluid flow beneath the float and the device further includes a liquid depth measuring device to monitor the level of the float in the pipe and hence the liquid level in the pipe. The device further includes a recording device to record the level of the float in the control pipe as measured by the measuring device and, also, the flow past the float.

10 Claims, 14 Drawing Figures

VOLUMETRIC FLOW MEASURING DEVICE

FIELD OF THE INVENTION

This invention relates to a volumetric flow measuring device for liquid flowing in a system and, more particularly, to a volumetric flow measuring device to measure flow past a manhole in an underground piping system.

BACKGROUND OF THE INVENTION

In the past there has repeatedly been a problem of measuring liquid flow in an underground system because, in this manner, one is able to determine where there are breaks in the system, or the flow is restricted for one reason or another stopping up the system. After a problem site has been located using the tool to be described hereinafter, it may then be readily repaired. The major problem, it will be appreciated, is in locating the area where the difficulty resides.

It is an object of this invention to provide a volumetric flow measuring device to measure flow past a manhole, for example, in an underground sewer system. Patents which show efforts in the past in the field are U.S. Pat. Nos. 2,283,906; 3,427,878; 3,633,417; and 3,681,988. The present invention differs from those of the prior art in that a control pipe is provided for telescopic engagement in an inlet pipe to a manhole and which control pipe includes exterior seal means to constrain flow past the manhole to a path through the control pipe and in which there is a float which is connected to the device so that a movable member, such as a paddle wheel, extending beneath the float is adapted to move in direct relation to the velocity of the flow through the control pipe to measure it and the level of the float in the pipe indicates the liquid level so that, by reason of the known cross sectional area of the control pipe and the velocity of the flow and the level of the float in the pipe a recording may be made when the depth and velocity of flow are sensed and transmitted to the recording device which will reflect the volume of the flow which is the function of the cross sectional area through which the flow takes place and its velocity.

OBJECTS OF THE INVENTION

It is, accordingly, an object of this invention to provide an improved volumetric flow device which is highly useful for measuring flow past a given point in an underground system and which is simple and inexpensive to manufacture and is well adapted or the purpose which is set forth hereinafter.

In accordance with this general object, the instant invention will now be described with reference to the accompanying drawings in which:

DESCRIPTION OF A PREFERRED EMBODIMENT

Figure 1:
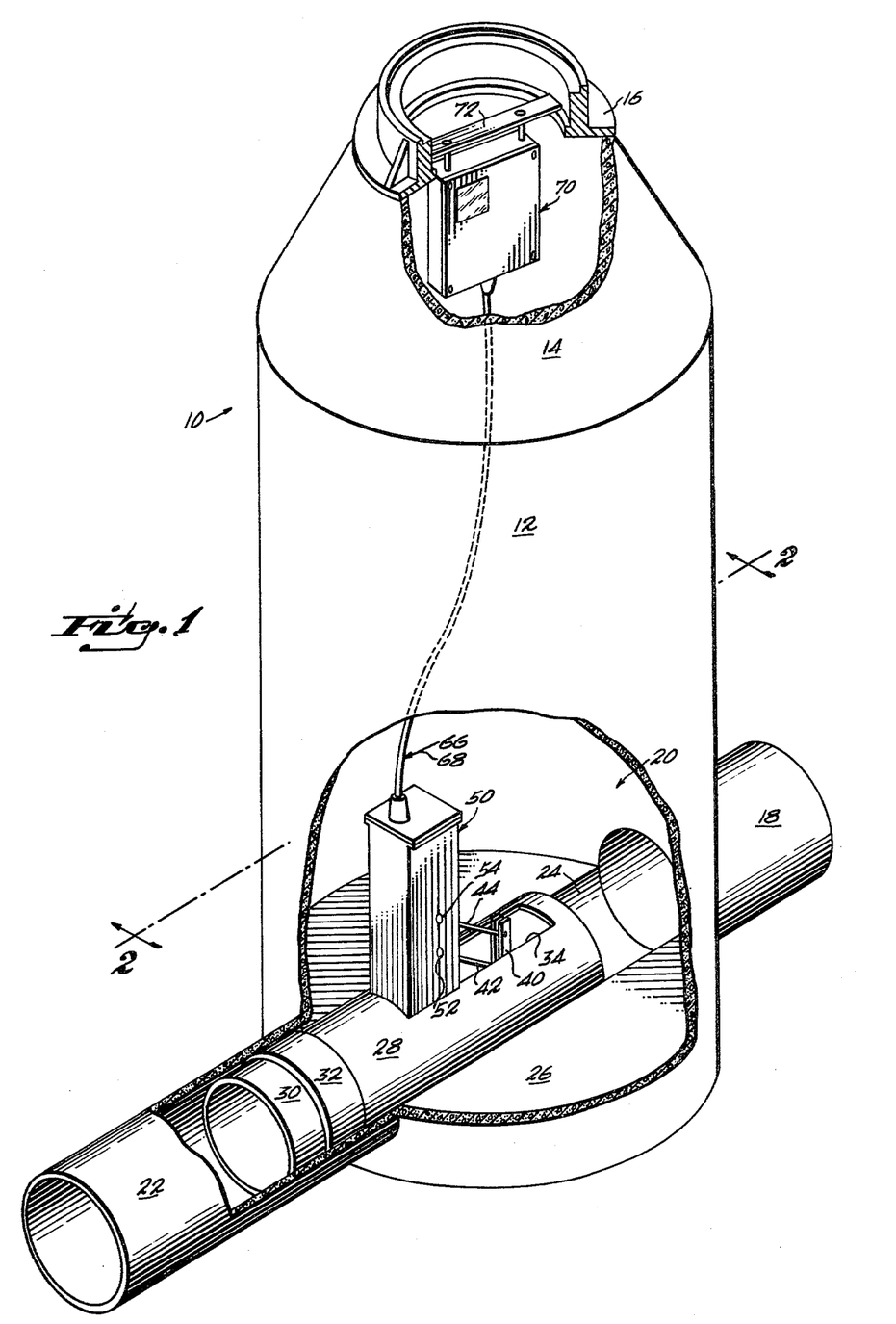
FIG. 1 is a perspective view of the volumetric flow meter device of the present invention installed relative to a manhole and a conduit normally having a liquid flow therethrough such as a sewer line.

With reference to the drawings in which like reference characters designate like or corresponding elements throughout the various views and with particular reference to FIG. 1, a manhole structure indicated generally at 10 includes a main generally cylindrical body portion 12 with a frustoconical upper portion 14 capped by an annular metal rim 16 to receive a manhole cover (not shown) in a conventional manner.

A conduit such as a sewer line pipe section 22 discharges a flow into the bottom chamber 20 of manhole 10 and out through a diametrically opposite exit pipe section 18. In the manhole a control pipe 28 is provided. It connects into the inlet pipe section 22 and extends into a semi-cylindrical groove 24 in the bottom wall 26 of the manhole 10. This length of control pipe 28 provides a known or predetermined inside cross sectional area. The end portion 30 of control pipe 28 is of a reduced diameter relative to exit pipe 22. It is telescoped into the pipe section 22, and is sealed relative thereto by suitable means which may be for example an exteriorly mounted O-ring or an inflatable exterior annular collar 32. Therefore, by reason of this exterior seal means, the entire volumetric flow from pipe section 18 is constrained to flow through the interior of the control pipe 28.

Figure 2:
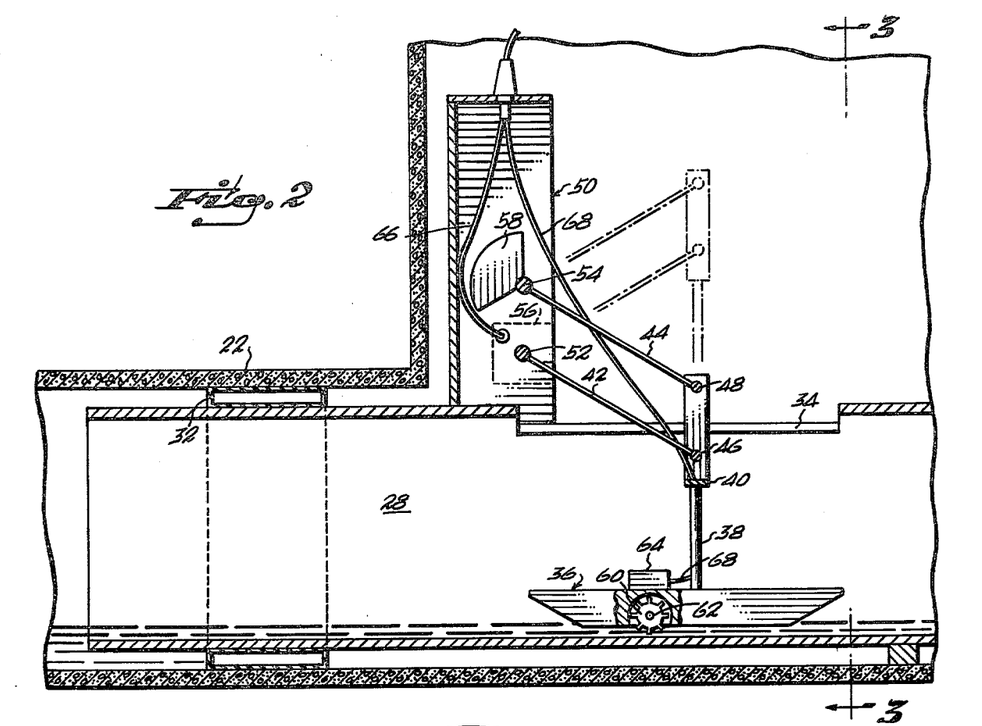
FIG. 2 is a vertical sectional view taken along line 2—2 of FIG. 1.
Figure 3:
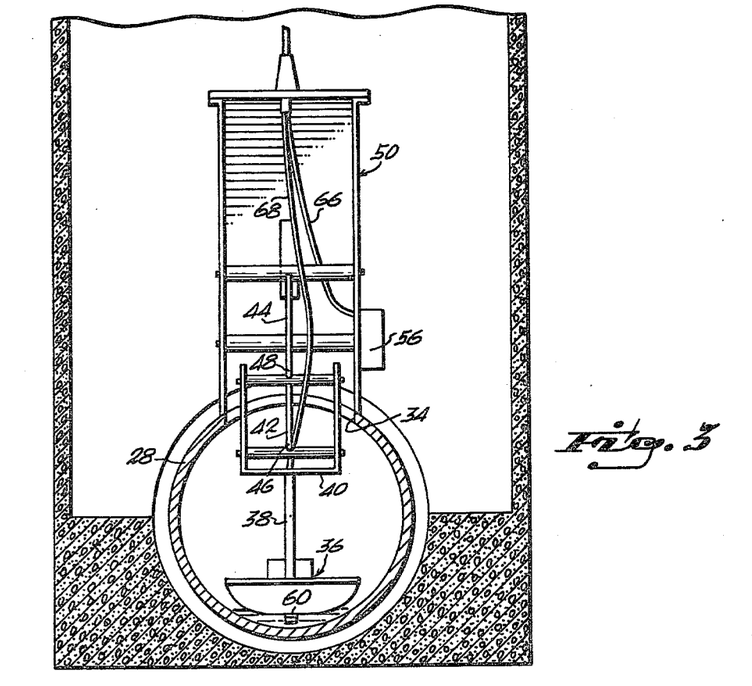
FIG. 3 is a vertical cross sectional view taken along line 3—3 of FIG. 2.

As illustrated in FIGS. 1, 2 and 3, a cut-out 34 is provided in the top portion of control pipe 28 for the reception therethrough of a float member 36 which rises and falls with the liquid level of the flow through the control pipe 28. It will be appreciated that the volume of the flow through the control pipe is a function of the cross sectional area of the liquid flow path and the liquid level of the flow, e.g., the depth of the liquid level of the flow in the control pipe 28 and the speed rate through the control pipe of known cross sectional area. Preferably, the float is sized relative to the cutout to practically seal the cutout when the pipe is full.

As seen in FIG. 2, the float 36 includes a vertical mast 38 extending centrally upwardly therefrom to a point of attachment to the bottom of a pivot bracket 40. The bracket 40 is bifurcated and its legs are spanned by an upper and a lower parallel pivot pin 48 and 46 respectively which are in spaced relation with respect to one another. From these pivot pins, a pivot link 42 and 44 extend, see FIG. 3. This provides a pair of parallel spaced apart pivot links 42 and 44 which are pivotally connected between the legs of the bracket 40 at their respective ends comprising the pivot pins 46 and 48. An upper bracket or tower 50 is provided on the control pipe above and adjacent the cut-out and it supports at its upper ends pivot pins 52 and 54. Float 36 is free to rise and fall in a stable condition with the rise and fall of the level of the fluid flow through the control pipe. A first potentiometer 56 is operably connected to one end of the pivot rod 52 and a counterweight 58 is fixed to the pivot rod 54.

Referring now to the float as seen in FIGS. 2 and 3, a paddlewheel 60 is journeled or centrall pivotally connected at 62 to the float 36 and extends somewhat therebelow for actuation by the fluid flow through the control pipe 28. A reed switch 64 is actuated by the paddlewheel 60. Electric leads 66 and 68, from the potentiometer 56 and the reed switch 64, extend upwardly to transmit signals to a recording mechanism in a manner to be hereinafter described relative to the circuit diagrams. The recording machine may be, as shown in FIG. 1, in the form of a box 70, suspended at 72 in the top end of the manhole 10.

Figure 4:
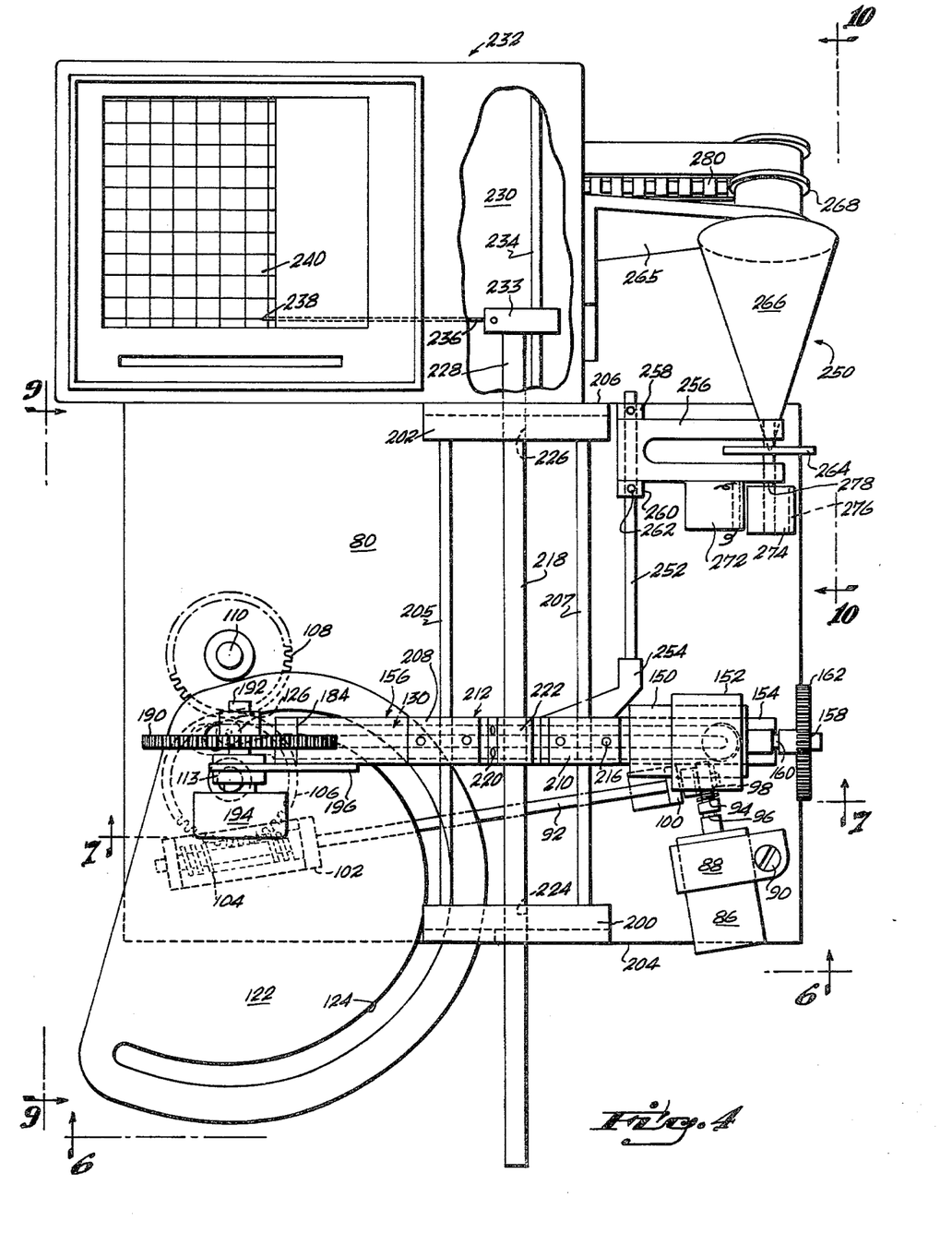
FIG. 4 is a top plan view of the flow meter with its associated operating mechanisms in first positions.
Figure 5:
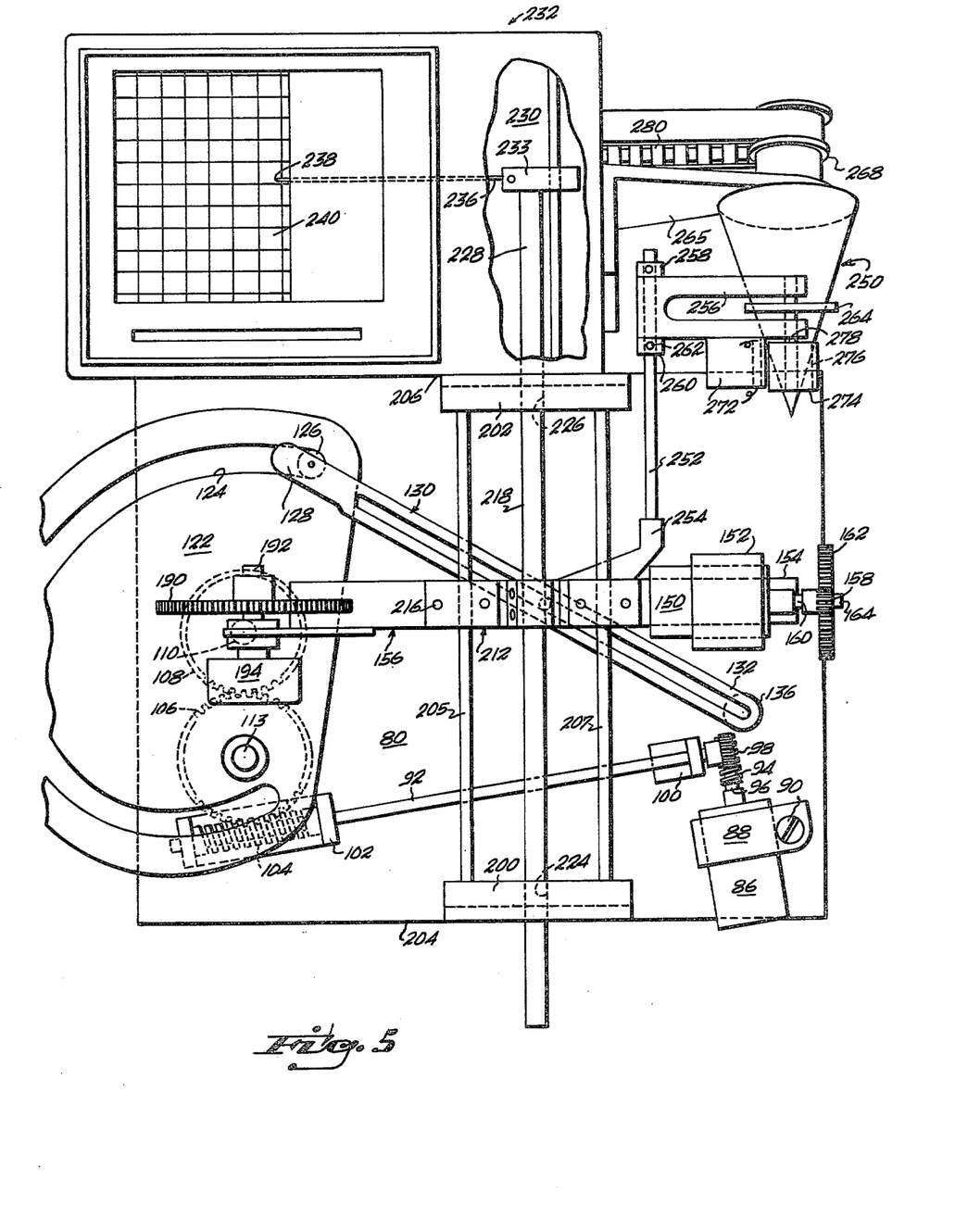
FIG. 5 is a top plan view similar to FIG. 4 with the operating mechanism in second positions.
Figure 6:
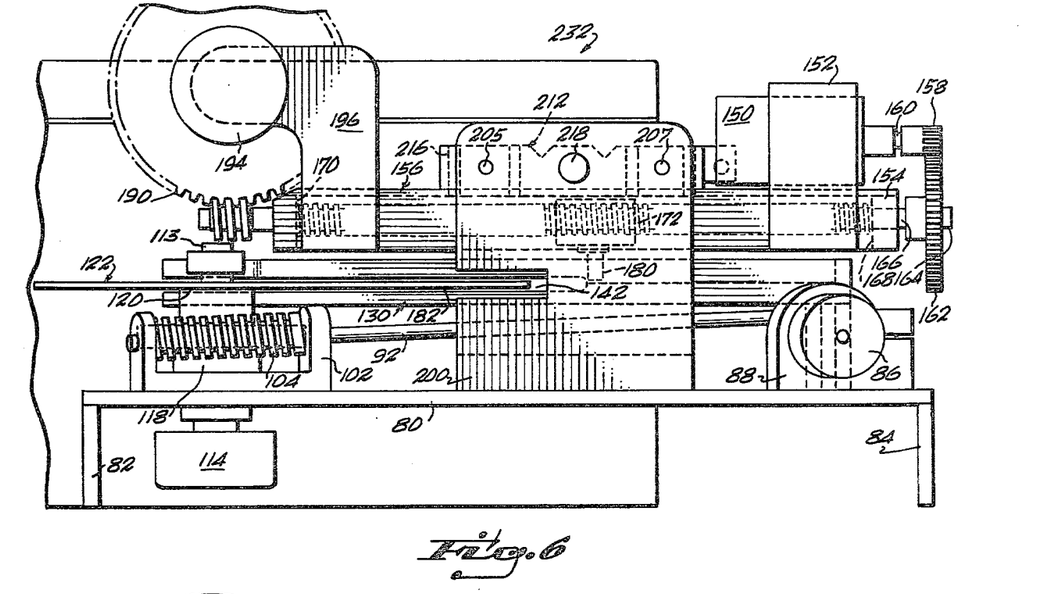
FIG. 6 is an enlarged fragmentary side view as seen along line 6—6 of FIG. 4.

FIG. 4, is a top plan view of a suitable recording mechanism contained in box 70 and includes a mounting base plate 80 supported on a pair of opposed vertical support plates 82, 84 as seen in FIG. 6. A first electric motor 86 fixed by the bracket 88 and screw 90 to base plate 80 is in the circuit with the reed switch 64 on float 36 and is drivingly engaged with a shaft 92 by means of a worm gear 94 on motor shaft 96 in mesh with a worm wheel 98 fixed on the first end of shaft 92. Shaft 92 is rotatably mounted in a bracket 100 fixed to base plate 80 at the first end and a U-bracket 102 fixed to base plate 80 at its second end. Within U-bracket, a second worm gear 104 is fixed to the second end of shaft 92 in driving engagement with a large gear 106 which is in turn in meshing engagement with a gear 108 fixed to a shaft 110, FIGS. 5 and 9, journaled at 112 through base plate 80. A second potentiometer 114 beneath base plate 80 is operably connected to shaft 110, FIG. 9.

Figure 7:
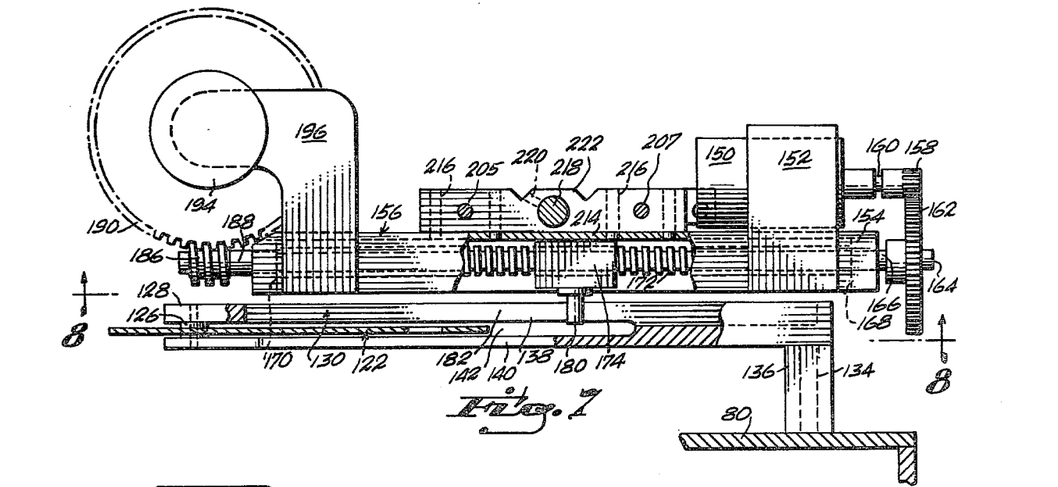
FIG. 7 is an enlarged fragmentary cross section view taken along line 7—7 of FIG. 4 with parts broken away to better illustrate the structure.
Figure 8:
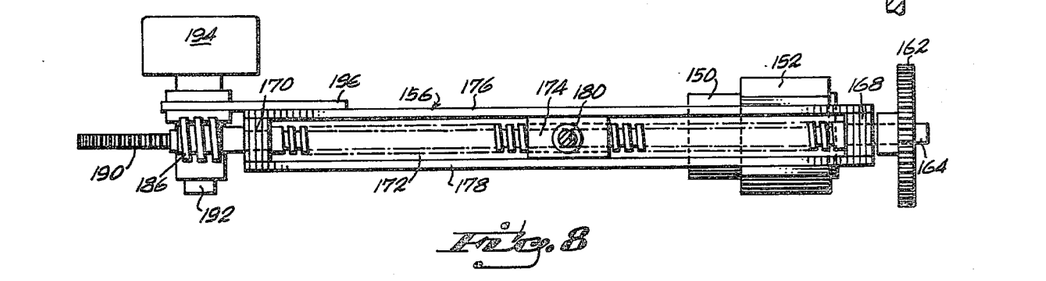
FIG. 8 is a sectional view looking upwardly as indicated by line 8—8 of FIG. 7.
Figure 9:
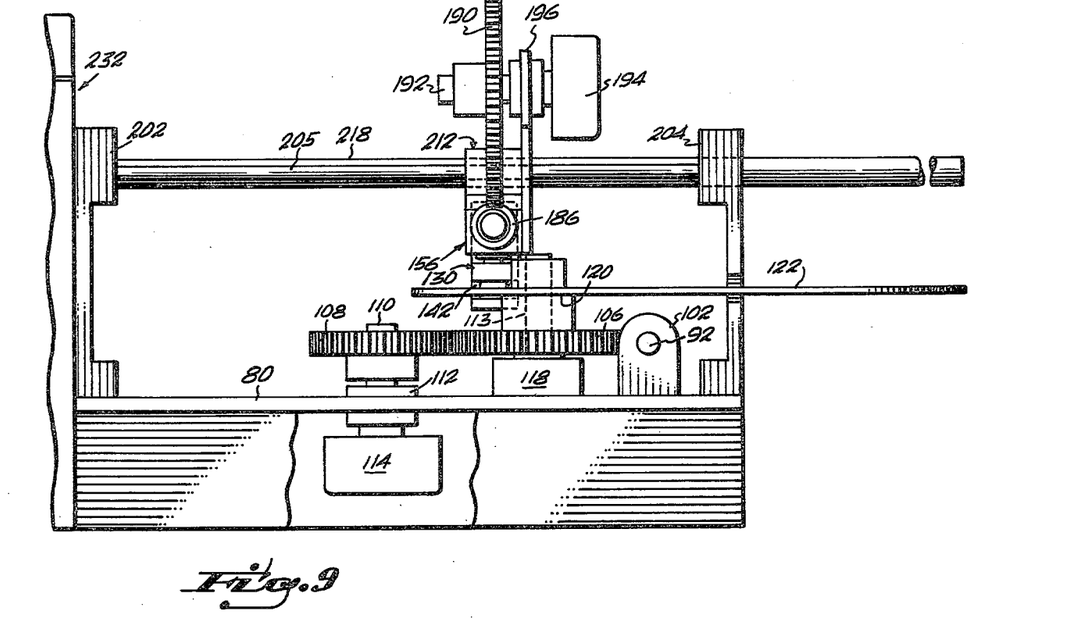
FIG. 9 is an enlarged fragmentary end elevational view as seen along line 9—9 of FIG. 4.

With further reference to FIGS. 4, 5 and 9, a stub shaft 113 carrying large gear 106 is rotatably journaled in a boss 118, fixed to the top of base plate 80. Fixed at 120, FIG. 9, to the upper end of stub shaft 113 of gear 106 is an area cam plate 122 with a cam slot 124 (see FIGS. 4 and 5) defined therein. As best seen in FIGS. 5 and 7, a cam follower 126, carried by the extended end 128 of an elongated arm 130 is engaged in cam slot 124. The end 132 of arm 130 opposite to the cam follower is pivoted at 134 in a boss 136, FIG. 7, fixed to the top of base plate 80. As further illustrated in FIG. 7, the arm 130 is bifuracated, providing upper and lower arm portions 138, 140 defining a lateral slot 142 therebetween for free passage of cam plate 122. The cam slot 124 is computed for a round pipe, as illustrated, to rotate arm 130 a maximum of 30 degrees, FIGS. 4 and 5, while cam slot 124 is turning 180 degrees in uniform motion with area change minus the variable friction as the float 36 rises from an empty to full condition of control pipe 28. Cam slot 124 can be computed for other than round pipe shapes.

A second, flow velocity electric motor 150 is in the circuit with the potentiometer 56 on bracket 50 and is mounted in a bracket 152, FIGS. 4 through 8 fixed to a first end 154 of a longitudinally extending inverted channel arm 156 which is disposed in an over-under relation with arm 130 in the pipe empty condition of FIGS. 4, 6 and 7 and which responds to the flow velocity in pipe 28. A small pinion gear 158 fixed to motor shaft 160 is in driving engagement with a large gear 162 fixed to an extended first end portion 164 of a shaft 166 journaled in opposed end blocks 168, 170 fixed in a closing relation to the opposed ends of inverted channel arm 156. The main length of shaft 166, between journal blocks 168, 170 is threaded as at 172 for engagement through an internally threaded slide block 174 which is constrained against rotational movement between the side flanges 176, 178 of inverted channel arm 156. A downwardly extending stud 180 from slide block 174 is engaged through a longitudinally extending vertical slot 182 through the upper arm portion 138 of elongated arm 130.

Outwardly of a second end 184 of inverted channel arm 156, a worm gear 186 is fixed to an extended second end portion 188 of shaft 166 in mesh with a large worm wheel 190 carried on a shaft 192 of a third potentiometer 194. Potentiometer 194 is carried by an angle shaped arm 196, fixed at its lower end to second end portion 184 of inverted channel arm 156.

A pair of opposed upstanding arms 200, 202 are fixed atop the respective outer and inner edge portions 204, 206 of base plate 80. Spanning the distance between, and fixed to arms 200, 202 is a pair of spaced apart parallel guide rods 205, 207 which are slidably engaged through opposite end portions 208, 210 of a slide block 212, fixed atop the base web 214 of the inverted channel arm 156. A plurality of pins 216 fix slide block 212 to base web 214. Extending intermediate guide rods 205, 207 and parallel therewith is a carriage rod 218, fixed by set screws 220 to a central portion 222 of slide block 212. Carriage rod 218 is slidably engaged through holes 224, 226 in the respective arms 200, 202.

An end 228 of carriage rod 218 extends outwardly beyond arm 202 and into an end compartment 230 of a recording device 232 which is a commercially available product and will therefore be described only insofar as it pertains to the present invention. Rod end 228 is fixed to a block 233 slidable along a guide rod 234 in compartment 230. Extending forwardly from block 233 is a needle 236 with a downwardly turned distal end portion 238 for engagement with the top surface of a strip of graph paper 240 which, in its conventional operation, is continually fed from a supply roll (not shown) onto a take-up roller (not shown). The surface of the graph paper 240 is pretreated in a manner so as to produce a dark spot upon each engagement by needle portion 238. In its conventional operation, the needle portion taps rapidly on the surface of graph paper 240 in a manner so as to define a continuous graph line on paper 240 during the simultaneous operation of the cross sectional area cam 122 and the carriage rod 218 by the flow velocity channel arm 156, due to the above described interconnected relationship of cam 122 and arm 156 by mean of stud 180 in slot 182.

Figure 10:
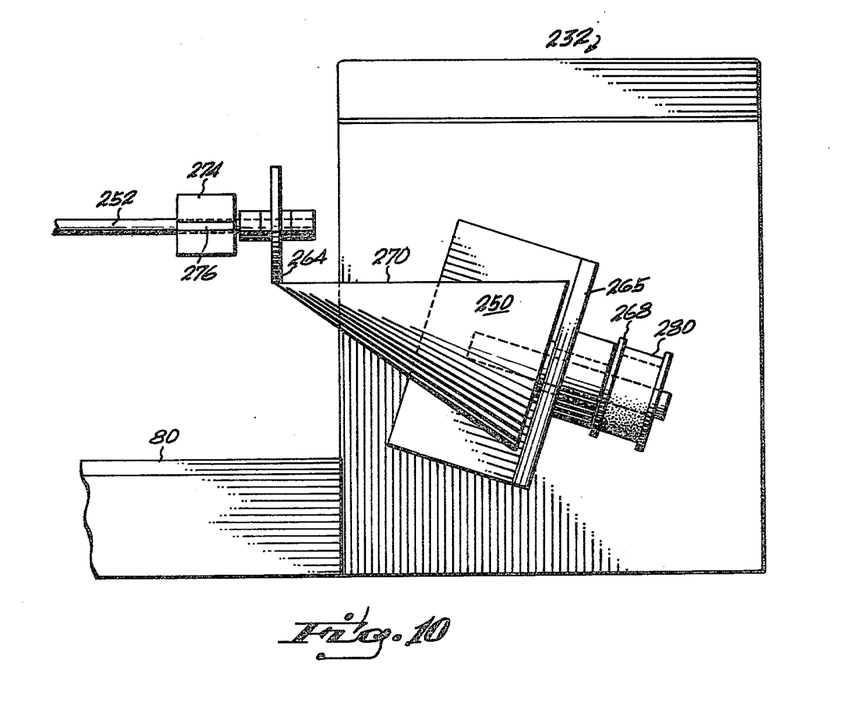
FIG. 10 is an enlarged fragmentary end elevational view as seen along line 10—10 of FIG. 4.

A multiplier assembly 250 is provided to proportionately drive the take-up roller of the graph paper to movement of the carriage rod 218 in response to area and velocity cam and arm 122, 156. To this end a rod 252 is fixed to channel arm 156 by means of a bracket 254. On its extended end a yoke arm 256 is pivotally carried between a pair of collars 258, 260 fixed thereto by pins 262. A roller wheel 264 is rotatably carried in the yoke of the extended end of arm 256. Bracket means 265 is fixed to the recording device 232 and a cone 266 and drive pulley 268 assembly is pivotally attached thereto in general alignment with roller wheel 264. As best seen in FIG. 10 the bracket, cone and pulley, 264, 266 and 268 are disposed in a predetermined angular relationship to base plate 80 to define a horizontal contact line 270 for roller wheel 264. A reed switch 272 is actuated by each pass of a magnet 276, the magnet being carried on the rotor 274 fixed to roller wheel shaft 278 in a manner to be subsequently described relative to the wiring diagrams.

The rotation of the shaft 113, see FIG. 5, is such that a 180° turn of the shaft represents the full diameter of the pipe; and the cam track 124 represents the area at the various points along a vertical diameter; the paddle wheel 60, see FIG. 2, operates the reed switch controlled motor 150; the motor 86 is operated by the potentiometer 56 relating to the depth.

Timing belt 280 is driven by the motor driving the paper on the standard recorder or by an additional motor running in a comparable speed. The cone 250, therefore, runs at a constant speed relative to the speed of the recorder paper.

The movement of the arm 256 and wheel 264 along the length of the cone is in relation to the motion of the recorder rod 228. (The recorder paper moves at a constant rate).

The movement of rod 228 and the needle end 238 are the result of the product of the depth area times the velocity and record a graph of variations of flow.

The purpose of the cone 250 and wheel 264 through actuation of the reed switch 272 will record the total volume flow on a standard counter during the full run or can record at any interval.

By reason of the above-described structure there are two signals which are received in the box 70, namely, a first signal which indicates the depth of the water in the tube and a second signal which indicates the rate of flow of the water past a given point on the float, the first being expressed in the form of voltage and the second being expressed in the form of pulses, by reason of the fact that the rpm's are sensed by a reed type switch is normally opened and spring-urged to a closed position and upon each revolution causes a pulse to be sent to the control box.

Figures 11, 12:
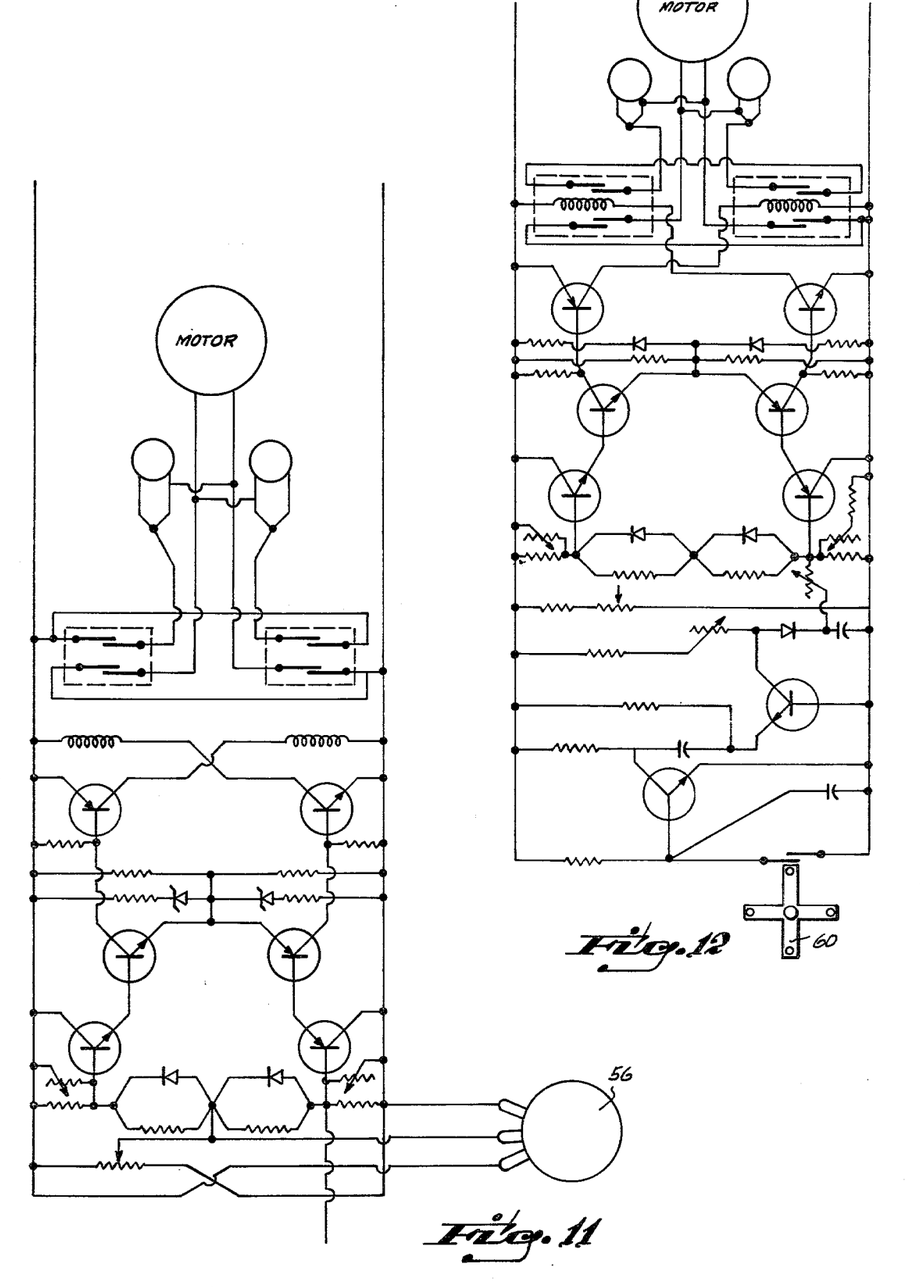
FIG. 11 is a circuit diagram of the flow velocity motor control board.
FIG. 12 is a circuit diagram of the volume motor control board.

Conventional electrical diagrams shown in FIGS. 11 and 12 illustrate suitable electrical means for transmitting information from the float. The height sensing potentiometer 56 is seen in the circuit conventionally illustrated in FIG. 11 while the paddle wheel means and associated circuit are shown in FIG. 12.

Figure 13:
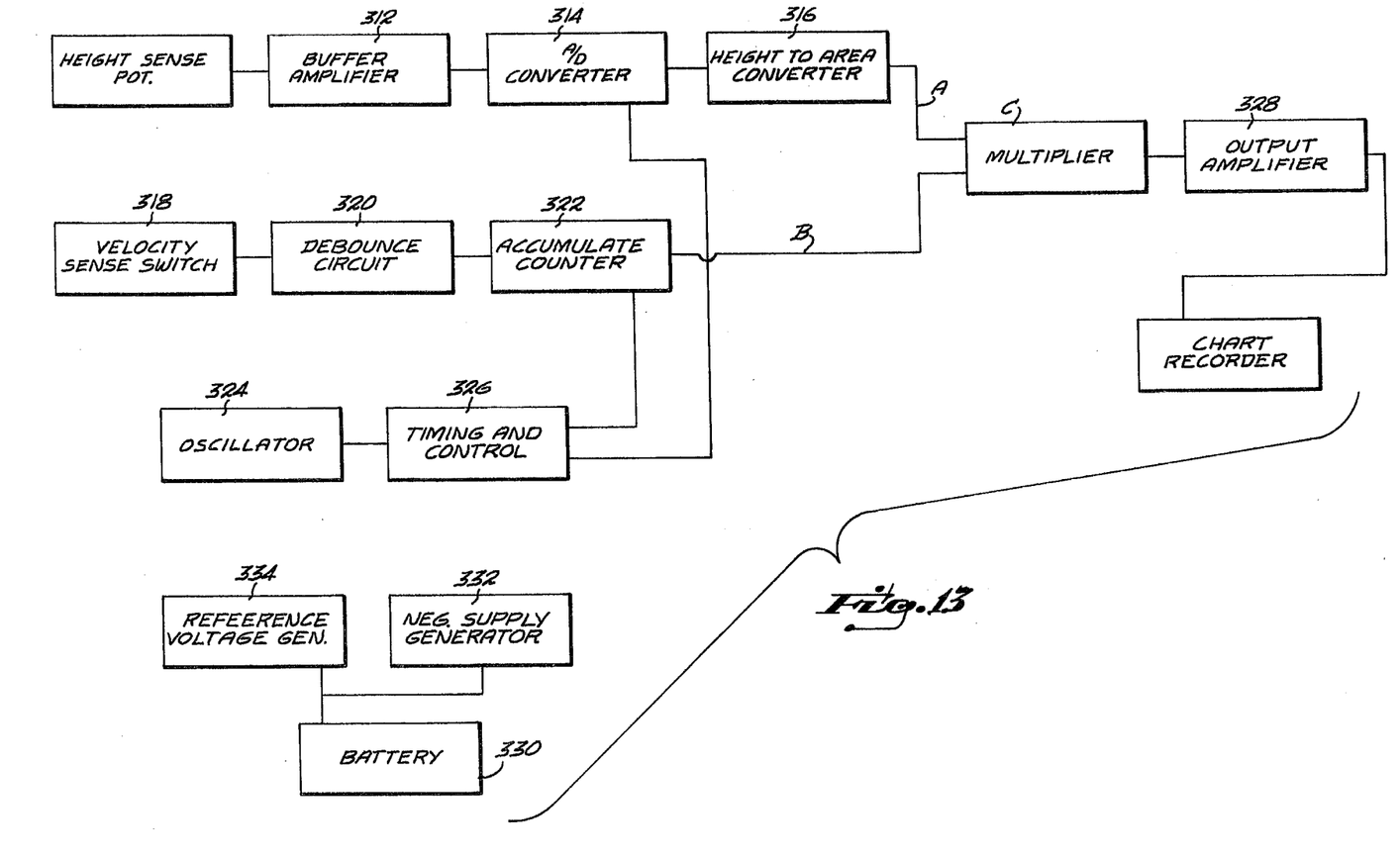
FIG. 13 is a schematic diagram of an alternative means to record the volumetric liquid flow through a confined area.

As an alternative, FIG. 13 illustrates an alternative circuit to that of FIGS. 11 and 12. First, with respect to the signal from the height sensing potentiometer, there is a buffer amplifier circuit of the type designated by the numeral 312 and which is conventional and which is to compensate for the long leads involved. In series with the buffer amplifier circuit there is an area analog to digital converter, a well known circuit to those in the art and which may be purchased as a chip commercially. This outputs a digital output of the 8 bit type in the preferred embodiment which comprises an area converter 316. The output address is in the form of 8 bits and represents a component by virtue of the height of the float and a component which is programmed to correspond to the cross sectional area of the pipe which corresponds to that in which the float is floating. In other words, the output is an 8 bit fractional measurement of the cross sectional area of the pipe which varies linearly according to the height of the water from the bottom to the top. This information is fed from the branch A into the multiplier C in the form of an 8 bit digital output.

Similarly to the multiplier C there is supplied information along the branch B which is determined from the velocity sensing switch 318 of the reed type and which preferably includes in series a debounce circuit 320 so as to compensate for a jitter effect. The pulses are accumulated in an accumulated counter 322 for given periods of time and then delivered to the multiplier C, again, in the form of an 8 bit output.

In order to provide a time reference, an oscillator 324 is provided together with a timing and control circuit 326 of a conventional type which is addressed to both the accumulator counter or circuit 322 for the pulses and also to the analog digital converter 314 as indicated by the diagram. From the multiplier an analog output is delivered to an output amplifier 328 and from there to a suitable commercially available chart recorder.

Figure 14:
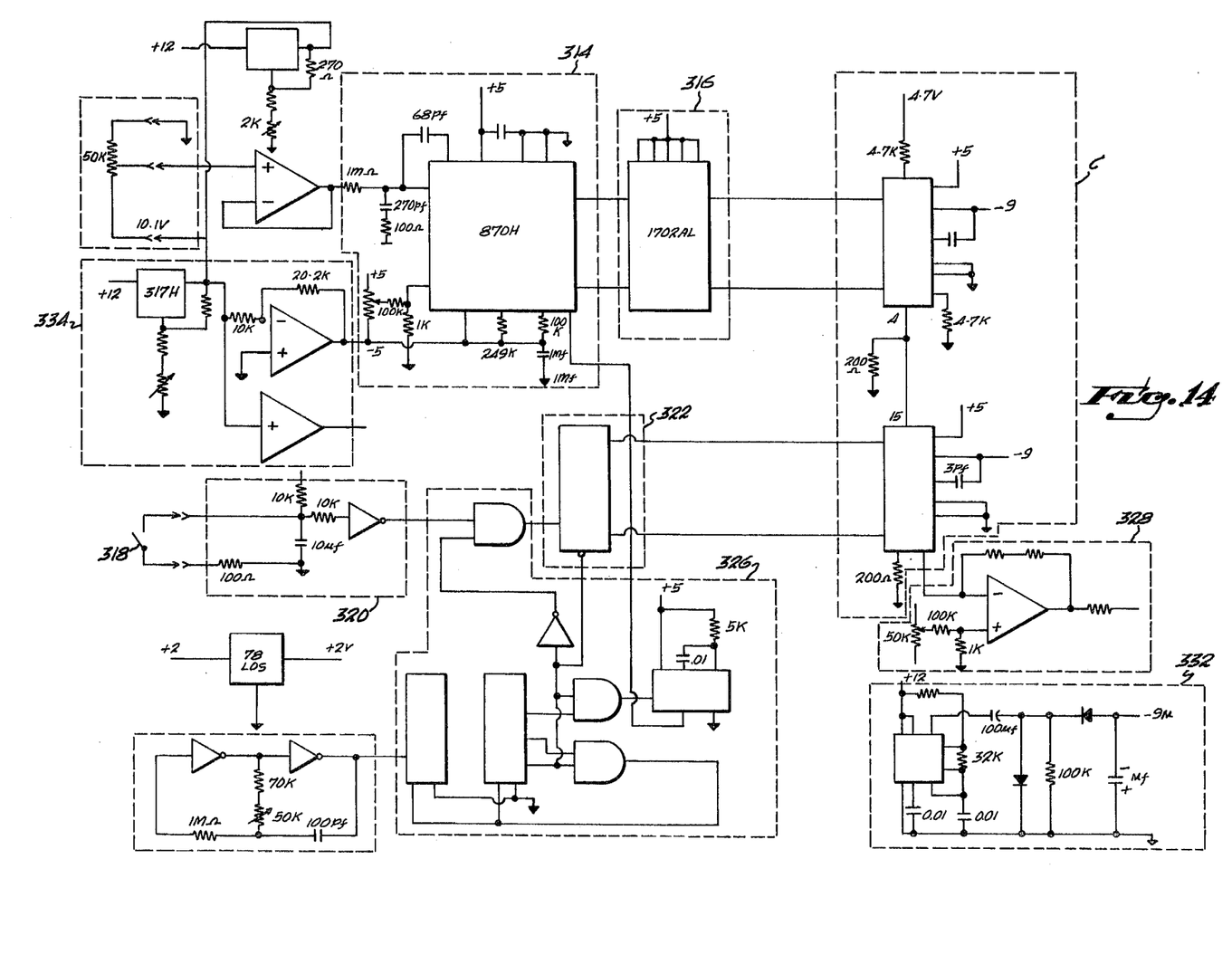
FIG. 14 is a conventional electrical diagram of the schematic shown in FIG. 13.

There is a power supply provided for the unit and in the preferred embodiment this comprises a twelve volt battery 330 which may include a negative supply generator circuit 332 and is further provided with a reference voltage generator 334 and which is utilized to drive the aforesaid two circuits in a conventional manner. A more detailed circuit of that shown schematically in FIG. 13 is shown in FIG. 14 and correspondingly designated.

What is claimed is:

1. For installation in a manhole with a tubular member exiting from the manhole to direct fluid flow past the manhole in a system,
a volumetric flow measuring device for liquid flowing in the system past the manhole, said device comprising:
a control pipe sized for receipt in the tubular member and including seal means to engage the tubular member and to constrain flow past the manhole to a path through the control pipe,
said control pipe defining a flowpath therethrough of predetermined cross sectional area; and
said pipe having an upper surface on a portion extending into the manhole, and said portion having a cutout in said upper surface,
a float member in the control pipe beneath said cutout comprising a buoyant body having an upper surface and a lower surface for rise and fall of the body vertically in line with the cutout depending upon the level of the liquid flowing through the pipe,
liquid flow velocity measuring means comprising paddle wheel means journaled on the float with a portion extending below the lower surface to move in response to fluid flow in the pipe,
means to connect the float to the pipe and to maintain it in vertical alignment with said cutout,
said device including liquid depth measuring means to measure continually the level of the float in the pipe, and
recording means to record the level of the float and the flow velocity, and including means operatively connecting said recording means and said liquid depth measuring means and said liqud flow velocity measuring means.

2. The device as set forth in claim 1 wherein said recording means includes electrical circuit means.

3. The device as set forth in claim 1 wherein said float includes a mast extending vertically from the upper surface of said body through said cutout, and said means operatively connecting includes said mast.

4. The device as set forth in claim 2 wherein said device includes a tower on said control pipe adjacent said cutout and said means operatively connecting include said tower.

5. The device as set forth in claim 3 wherein said means operatively connecting includes pivot means and link means interconnected with one another and to said tower and to said mast.

6. The device as set forth in claim 4 wherein a potentiometer is included on said tower operatively engaging said pivot pin and link means.

7. The device as set forth in claim 5 wherein said flow velocity measuring means comprises a potentiometer operatively connected to said paddle wheel means.

8. The device as set forth in claim 6 wherein said recording means includes a box adapted to be suspended in the top of the manhole.

9. The device as set forth in claim 7 wherein said recording means includes a recording mechanism comprising a base and spaced vertical support members on the base, a first electric motor secured to the base and conductor means to conduct the motor with the potentiometer of said flow velocity measuring means.

10. The device as set forth in claim 1 wherein said recording means includes a needle and means movably mounting the needle to said device.

* * * * *